US011287368B2

(12) United States Patent
Li et al.

(10) Patent No.: US 11,287,368 B2
(45) Date of Patent: Mar. 29, 2022

(54) THIN FILM MULTIVARIATE OPTICAL ELEMENT AND DETECTOR COMBINATIONS, THIN FILM OPTICAL DETECTORS, AND DOWNHOLE OPTICAL COMPUTING SYSTEMS

(71) Applicant: Halliburton Energy Services, Inc., Houston, TX (US)

(72) Inventors: Jian Li, Houston, TX (US); James M. Price, Woodlands, TX (US); Bin Dai, Spring, TX (US); Christopher Michael Jones, Katy, TX (US); Daniel Stark, Houston, TX (US); John Laureto Maida, Jr., Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 210 days.

(21) Appl. No.: 16/346,466

(22) PCT Filed: Jul. 13, 2018

(86) PCT No.: PCT/US2018/042118
§ 371 (c)(1),
(2) Date: Apr. 30, 2019

(87) PCT Pub. No.: WO2020/013865
PCT Pub. Date: Jan. 16, 2020

(65) Prior Publication Data
US 2020/0256788 A1 Aug. 13, 2020

(51) Int. Cl.
*G01N 21/31* (2006.01)
*G01J 3/28* (2006.01)
*G01V 8/02* (2006.01)

(52) U.S. Cl.
CPC .............. *G01N 21/31* (2013.01); *G01J 3/28* (2013.01); *G01V 8/02* (2013.01)

(58) Field of Classification Search
CPC ..... G01N 21/31; G01N 2201/129; G01J 3/28; G01J 3/0202; G01J 2003/283;
(Continued)

(56) References Cited

U.S. PATENT DOCUMENTS

| 8,094,311 B2 | 1/2012 | Uzunbajakava et al. |
| 8,350,233 B2 | 1/2013 | Ferrini et al. |

(Continued)

FOREIGN PATENT DOCUMENTS

| WO | 2007064575 A1 | 6/2007 |
| WO | 2013160008 A1 | 10/2013 |

(Continued)

OTHER PUBLICATIONS

International Search Report and Written Opinion for International Application No. PCT/US2018/021195, dated Oct. 17, 2018.

(Continued)

*Primary Examiner* — Michael P LaPage
(74) *Attorney, Agent, or Firm* — McGuireWoods LLP (57) ABSTRACT

The disclosed embodiments include thin film multivariate optical element and detector combinations, thin film optical detectors, and downhole optical computing systems. In one embodiment, a thin film multivariate optical element and detector combination includes at least one layer of multivariate optical element having patterns that manipulate at least one spectrum of optical signals. The thin film multivariate optical element and detector combination also includes at least one layer of detector film that converts optical signals into electrical signals. The thin film optical detector further includes a substrate. The at least one layer of multivariate optical element and the at least one layer of detector film are deposited on the substrate.

20 Claims, 6 Drawing Sheets

(58) Field of Classification Search
CPC ......... G01J 2003/2833; G01J 2003/284; G01J 2003/1226; G01J 2003/1247; G01V 8/02
See application file for complete search history.

(56) References Cited

U.S. PATENT DOCUMENTS

| | | | |
|---|---|---|---|
| 8,902,423 B2 | 12/2014 | Myrick et al. | |
| 9,157,800 B2 | 10/2015 | Priore et al. | |
| 2002/0026981 A1* | 3/2002 | Fukushima | G02B 5/20 156/264 |
| 2006/0076584 A1* | 4/2006 | Kim | H01L 51/0013 257/275 |
| 2007/0148760 A1* | 6/2007 | Klesel | G01J 3/0256 435/287.2 |
| 2011/0111333 A1* | 5/2011 | Cheng | G03F 7/0007 430/7 |
| 2011/0216315 A1* | 9/2011 | Uematsu | G01J 3/0262 356/326 |
| 2012/0082925 A1* | 4/2012 | Wang | G02B 5/201 430/7 |
| 2016/0027938 A1 | 1/2016 | Stoica et al. | |
| 2016/0111461 A1* | 4/2016 | Ahn | H01L 27/14612 250/208.1 |
| 2016/0123884 A1 | 5/2016 | Priore | |
| 2016/0274077 A1 | 9/2016 | Perkins | |
| 2017/0059408 A1 | 3/2017 | Pelletier et al. | |
| 2017/0115436 A1* | 4/2017 | Qian | H04N 9/04553 |
| 2017/0160189 A1 | 6/2017 | Priore | |
| 2017/0176324 A1 | 6/2017 | Perkins et al. | |
| 2017/0241836 A1 | 8/2017 | Langner et al. | |
| 2017/0241839 A1 | 8/2017 | Perkins | |
| 2017/0284931 A1 | 10/2017 | Perkins et al. | |
| 2018/0031729 A1 | 2/2018 | Maguire-Boyle et al. | |
| 2018/0295295 A1* | 10/2018 | Hicks | H01L 27/14649 |
| 2019/0086593 A1* | 3/2019 | Cho | C08G 61/04 |
| 2019/0305016 A1* | 10/2019 | Tsang | G01J 3/26 |

FOREIGN PATENT DOCUMENTS

| | | |
|---|---|---|
| WO | 2015171146 A1 | 11/2015 |
| WO | 2017061986 A1 | 4/2017 |

OTHER PUBLICATIONS

Z. Smith, et al., "Multivariate optical computing using a digital micromirror device for fluorescence and Raman spectroscopy", Optics Express, Aug. 29, 2011, vol. 19, No. 18.

D.P. Poenar, "Thin-fiim optical sensors with silican-compatible materials", Applied Optics, Jul. 20, 1997, p. 5109-21, vol. 36, No. 21.

International Search Report and Written Opinion for corresponding PCT Application No. PCT/US2018/042118 dated Apr. 9, 2018, 18 pages.

* cited by examiner

THIN FILM MULTIVARIATE OPTICAL ELEMENT AND DETECTOR COMBINATIONS, THIN FILM OPTICAL DETECTORS, AND DOWNHOLE OPTICAL COMPUTING SYSTEMS

BACKGROUND

The present disclosure relates generally to thin film multivariate optical element and detector combinations, thin film optical detectors and optical computing systems.

Optical computing in situ is often desirable to determine material properties of downhole samples during hydrocarbon exploration and production. Certain optical computing systems utilize multivariate optical elements that are deployed downhole to manipulate optical signals. The manipulated optical signals are transmitted to another downhole location, where the manipulated optical signals are detected by an optical detector, which converts the detected optical signals into electrical signals. However, the practical ability to implement optical computing systems in certain environments may be limited by space constraints.

BRIEF DESCRIPTION OF THE DRAWINGS

Illustrative embodiments of the present disclosure are described in detail below with reference to the attached drawing figures, which are incorporated by reference herein, and wherein.

The illustrated figures are only exemplary and are not intended to assert or imply any limitation with regard to the environment, architecture, design, or process in which different embodiments may be implemented.

DETAILED DESCRIPTION

In the following detailed description of the illustrative embodiments, reference is made to the accompanying drawings that form a part hereof. These embodiments are described in sufficient detail to enable those skilled in the art to practice the invention, and it is understood that other embodiments may be utilized and that logical structural, mechanical, electrical, and chemical changes may be made without departing from the spirit or scope of the invention. To avoid detail not necessary to enable those skilled in the art to practice the embodiments described herein, the description may omit certain information known to those skilled in the art. The following detailed description is, therefore, not to be taken in a limiting sense, and the scope of the illustrative embodiments is defined only by the appended claims.

The present disclosure relates to thin film multivariate optical element and detector combinations, thin film optical detectors, and downhole optical computing systems that utilize thin film multivariate optical element and detector combinations and thin film optical detectors to convert optical signals to electrical signals. In some embodiments, a thin film multivariate optical element and detector combination is formed from microscopic layers of multivariate optical element and detector film formed over a substrate. More particularly, each layer of multivariate optical element and detector film has a thickness that is several micrometers thick or less. In one or more embodiments, each layer of multivariate optical element and detector film is less than 100 µm thick. In one or more of such embodiments, each layer of multivariate optical element and detector film is less than 1 µm thick.

The multivariate optical element generates a spectral pattern that manipulates the optical properties of the optical signals, such that the properties of the outgoing optical signals facilitate an analysis of a sample of interest. In one or more embodiments, the multivariate optical element has patterns that manipulate spectrums of optical signals to improve correlations between the spectrums of the optical signals and properties of the sample of interest. As referenced herein, a spectrum of optical signals is manipulated when a spectral distribution of any property of the optical signals (e.g., intensity vs. wavelength, polarization vs. wavelength, etc.) is changed. Examples of patterns of the multivariate element include, but are not limited to, transmission patterns, reflection patterns, scattering patterns, as well as other suitable patterns that manipulate the spectrums of optical signals. In one or more embodiments, the manipulation or processing is carried out when optical signals (e.g., from an incident light) interact with the multi-variate optical element. After such interaction, the out-going optical signals are manipulated in a way that enhances the possibility (or probability) of determining a sample property of interest from the detected signals by improving one or more correlations between the optical signals with the sample property. For example, where a property of the sample is the sample's density (e.g., gas to oil ratio), the sample's density may be closely correlated with the intensity spectrum of optical signals that pass through the sample. In one or more of such embodiments, the multivariate optical element may manipulate the spectrums of optical signals to improve the correlation between the intensity spectrum of the optical signals (that first pass through the sample and then pass through the MOE) and the sample's density. In one or more embodiments, the improved correlations between the optical signals and the sample property are easier for an analyst or for other analytical instruments (e.g., sensors, etc.) to perform property analysis of the sample of interest. The manipulated optical signals are detected by the detector film, which converts the manipulated optical signals into electrical signals. In some embodiments, the thin film multivariate optical element and detector combination includes multiple layers of multivariate optical elements deposited on top of each other. In such embodiments, the optical signals are manipulated as the optical signals pass through the layers of multivariate optical element. Examples of the multivariate optical element include layers formed from silicon, silicon dioxide, silicon nitride, germanium, gallium arsenide, silicon carbide, titanium, chromium, gold, silver, glass with embedded metallic nanoparticles, glass with ionic dopants, gradient index glass, glass with a periodic variation in its refractive index, as well as other materials that generate a spectral pattern. In some embodiments, the thin film multivariate optical element and detector combination also includes multiple layers of detector films that are stacked on top of each other. Examples of detector films include p-type semiconductors, n-type semiconductors, photodetectors, photodiodes, photoresistors, phototransistors, quantum dot photoconductors, photovoltaics, quantum dot photodiodes, graphene photodetectors, as well as other photoelectric materials. In some embodiments, at least one layer of detector film is embedded in between two layers of multivariate optical elements. Additional configurations of the thin film detectors having multivariate optical elements and detector films are provided in the paragraphs below and are illustrated in at least FIGS. 2A-2F.

In some embodiments, the thin film multivariate optical element and detector combination is formed from multiple layers of detector film formed over a substrate. In such embodiments, at least one layer of detector film has material properties that generate a spectral pattern that manipulates the optical signals by manipulating properties of the optical signals, such that the properties of the outgoing optical signals facilitate an analysis of a sample of interest. The manipulated optical signals are converted by the remaining detector films into electrical signals. Additional configurations of thin film detectors having multiple layers of detector films are provided in the paragraphs below and are illustrated in at least FIGS. 3A and 3B.

In some embodiments, the substrate is formed from a flexible material that allows the substrate to conform to the shape of a downhole tool that is deployed downhole or the shape of a conveyance (defined below) that is deployed downhole. Examples of the flexible material include, but are not limited to PVDF (poly-vinylidene difluoride), $PP_2$ (polypropylene), PTFE (polytetrafluroethylene), FEP (fluorinated ethylene propylene), PFA (perfluoroalkoxy), quartz glass, borosilicate glass, sapphire, CPVC (chlorinated polyvinyl chloride), ECTFE (ethylene chlorotrifluoroethylene), kapton (poly (4,4'-oxydiphenylene-pyromellitimide), PCTFE (polychlorotrifluoroethylene), PE (polyethylene), PP (polypropylene), PVC (polyvinyl chloride), PEEK (polyether ether ketone), PET (poly(ethylene terephthalate)), polyester, as well as other flexible materials. In some embodiments, a surface of the substrate has an adhesive material that allows the substrate to be affixed to a tool or to a conveyance. In some embodiments, the adhesion is through chemical adhesion; in other embodiments, the adhesion is through electrostatic adhesion. It further embodiments, the adhesion is through mechanical support. In some embodiments, the substrate has a thickness of less than 1 cm to allow the thin film optical detector to be deployed in different downhole environments, where space constraint may prohibit deployment of other types of optical detectors. In one or more of such embodiments, the substrate has a thickness that is less than 0.5 mm. In one or more of such embodiments, the substrate has a thickness that is less than 0.3 mm. In some embodiments, the thin film optical detector also includes a reflective layer positioned between the at least one layer of detector film and the substrate. In such embodiments, a portion of the optical signals that pass through the at least one layer of detector film is reflected back to the at least one layer of detector film to augment the optical signal. In some embodiments, the thin film optical detector also includes a reflective layer positioned opposite the at least one layer of detector film and the substrate. In such embodiments, the substrate can also function as a multivariate optical element to manipulate properties of the optical signal. In some embodiments, the substrate can also function as a detector, eliminating the need for one layer of detector film.

In some embodiments, the thin film multivariate optical element and detector combination described herein is a component of a downhole optical computing system. In such embodiments, the downhole optical computing system also includes an optical source that transmits optical signals downhole. Examples of the optical source include lasers, fiber optic cables, electric discharge lamps, incandescent lamps, blackbodies, light emitting diodes, supercontinuum sources, fluorescent sources, electric sparks, arc lamps, photoluminscent sources, radioluminescent sources, as well as other sources of optical signals. In some embodiments, the optical computing system also includes a downhole tool that is deployed downhole. In one or more of such embodiments, the thin film multivariate optical element and detector combination is a component of the downhole tool. In one or more such embodiments, where a surface of the substrate has an adhesive, the adhesive binds the thin film multivariate optical element and detector combination to the downhole tool. Additional descriptions of thin film multivariate optical element and detector combinations, thin film optical detectors, and downhole optical computing systems are described in the paragraphs below and are illustrated in FIGS. 1-4.

Figure 1A:
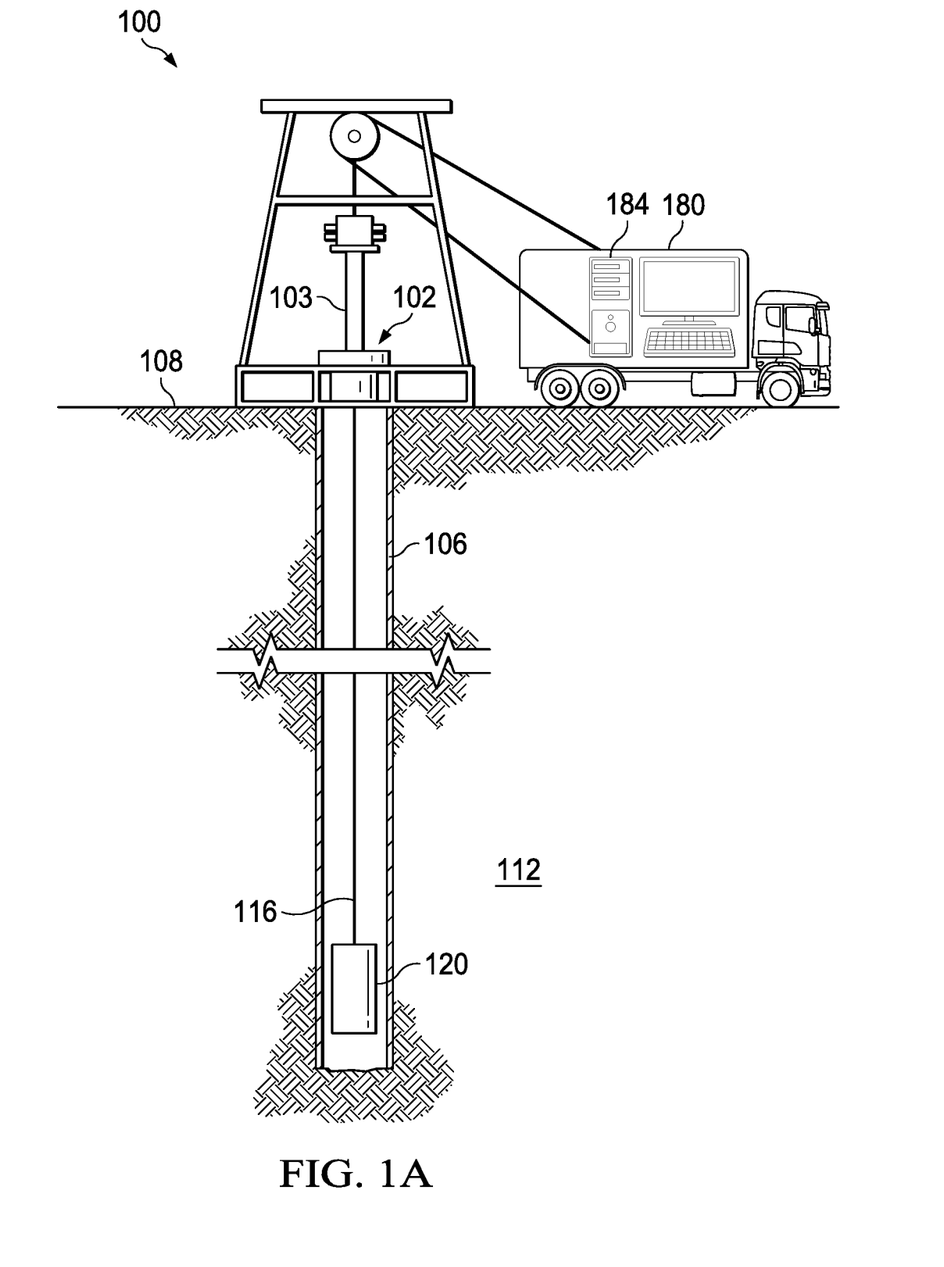
FIG. 1A is a side view of a logging environment with a thin film multivariate optical element and detector combination deployed in a borehole to convert optical signals detected by the thin film multivariate optical element and detector combination to electrical signals.

Turning now to the figures, FIG. 1A is a side view of a logging environment 100 with a thin film multivariate optical element and detector combination 120 deployed in a borehole 106 to convert optical signals detected by thin film multivariate optical element and detector combination 120 to electrical signals. FIG. 1A may also represent another completion or preparation environment where a logging operation is performed. In the embodiment of FIG. 1A, a well 102 having the borehole 106 extends from a surface 108 of the well 102 to or through a formation 112. A conveyance 116, optionally carried by a vehicle 180, is positioned proximate to the well 102. The conveyance 116 along with the thin film multivariate optical element and detector combination 120 are lowered down the borehole 106, i.e. downhole. In one or more embodiments, the conveyance 116 and the thin film multivariate optical element and detector combination 120 are lowered downhole through a blowout preventer 103. In one or more embodiments, the conveyance 116 may be wireline, slickline, coiled tubing, drill pipe, production tubing, fiber optic cable, downhole tractor or another type of conveyance operable to deploy the thin film multivariate optical element and detector combination 120. The conveyance 116 provides mechanical suspension of the thin film multivariate optical element and detector combination 120 as the thin film multivariate optical element and detector combination 120 is deployed downhole. In one or more embodiments, the conveyance 116 also transmits optical signals to the thin film multivariate optical element and detector combination 120. In one or more embodiments, the conveyance 116 also provides power to the thin film multivariate optical element and detector combination 120 as well as other downhole components. In one or more embodiments, the conveyance 116 also provides downhole telemetry. Additional descriptions of telemetry are provided in the paragraphs below. In one or more embodiments, the conveyance 116 also provides a combination of power and downhole telemetry to the thin film multivariate optical element and detector combination 120. For example, where the conveyance 116 is a wireline, coiled tubing (including electro-coiled-tubing), or drill pipe, power and data are transmitted along the conveyance 116 to the thin film multivariate optical element and detector combination 120.

In some embodiments, the thin film multivariate optical element and detector combination 120 is communicatively connected to the controller 184 via a telemetry system described herein and is operable to transmit data indicative of electrical signals generated by the thin film multivariate optical element and detector combination 120 to the controller 184. An operator may then access the controller 184 to analyze such data. As defined herein, the controller 184 represents any electronic device operable to receive data indicative of electrical signals generated by the thin film multivariate optical element and detector combination 120.

Figure 1B:
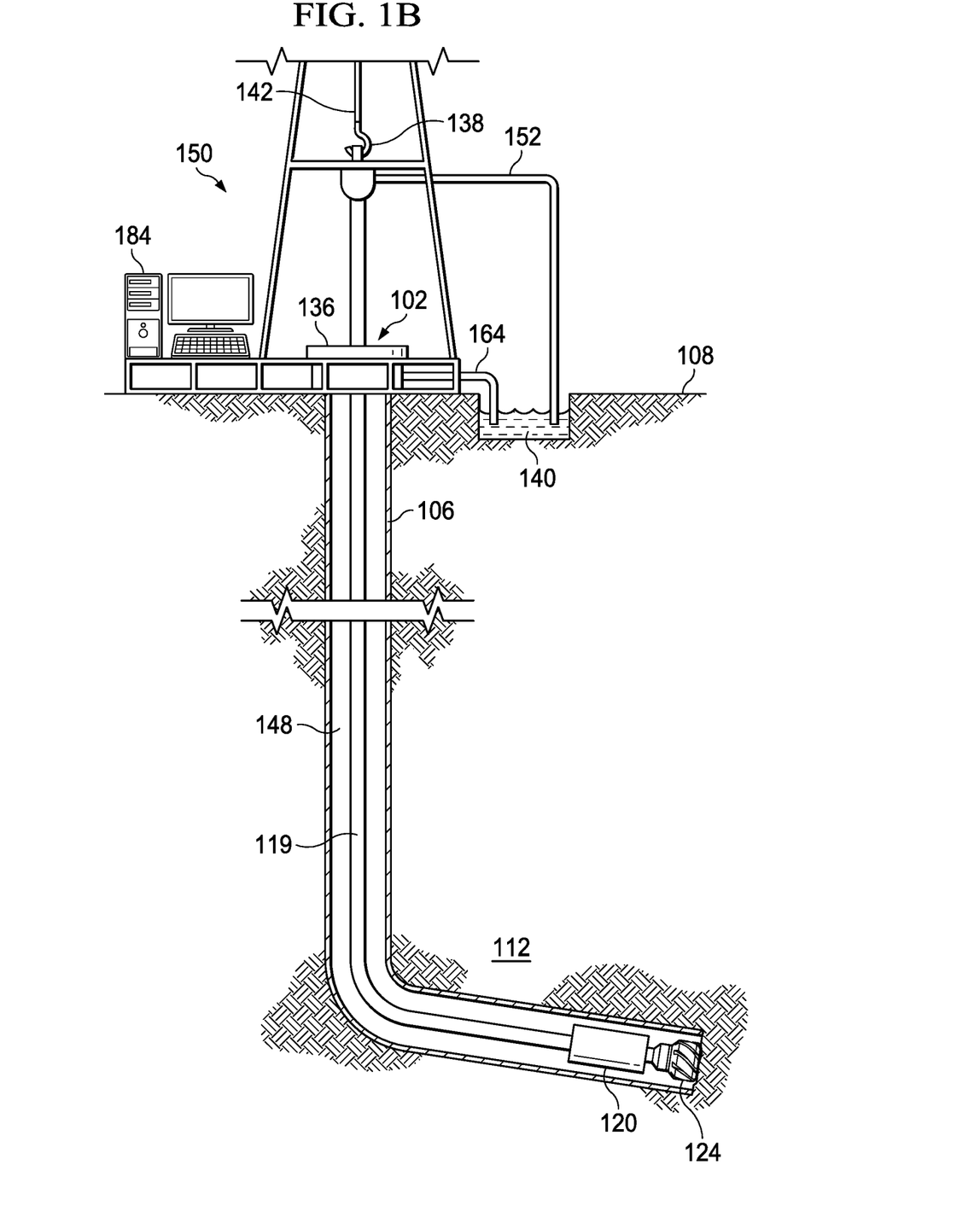
FIG. 1B is a side view of a logging while drilling (LWD)/measurement while drilling (MWD) environment with another thin film multivariate optical element and detector combination deployed to convert optical signals detected by the thin film multivariate optical element and detector combination to electrical signals.

FIG. 1B is a side view of a LWD/MWD environment 150 with another thin film multivariate optical element and detector combination 120 deployed to measure the properties of the formation 112 during a drilling operation. FIG. 1B may also represent another completion or preparation environment where a drilling operation is performed. A hook 138, cable 142, traveling block (not shown), and hoist (not shown) are provided to lower a drill sting 119 down the borehole 106 or to lift the drill string 119 up from the borehole 106.

At the wellhead 136, an inlet conduit 152 is coupled to a fluid source (not shown) to provide fluids, such as drilling fluids, downhole. The drill string 119 has an internal cavity that provides a fluid flow path from the surface 108 down to the thin film multivariate optical element and detector combination 120. In some embodiments, the fluids travel down the drill string 119, through the thin film multivariate optical element and detector combination 120, and exit the drill string 119 at the drill bit 124. The fluids flow back towards the surface 108 through a wellbore annulus 148 and exit the wellbore annulus 148 via an outlet conduit 164 where the fluids are captured in container 140. In LWD systems, sensors or transducers (not shown) are typically located at the lower end of the drill string 119. In one or more embodiments, sensors employed in LWD applications are built into a cylindrical drill collar that is positioned close to the drill bit 124. While drilling is in progress, these sensors continuously or intermittently monitor predetermined drilling parameters and formation data, and transmit the information to a surface detector by one or more telemetry techniques, including, but not limited to mud pulse telemetry, acoustic telemetry, and electromagnetic wave telemetry. In one or more embodiments, where a mud pulse telemetry system is deployed in the borehole 106 to provide telemetry, telemetry information is transmitted by adjusting the timing or frequency of viable pressure pulses in the drilling fluid that is circulated through the drill string 119 during drilling operations. In one or more embodiments, an acoustic telemetry system that transmits data via vibrations in the tubing wall of the drill string 119 is deployed in the borehole 106 to provide telemetry. More particularly, the vibrations are generated by an acoustic transmitter (not shown) mounted on the drill string 119 and propagate along the drill string 119 to an acoustic receiver (not shown) also mounted on the drill string 119. In one or more embodiments, an electromagnetic wave telemetry system that transmits data using current flows induced in the drill string 119 is deployed in the borehole 106 to provide telemetry. Additional types of telemetry systems, such as electric telemetry or optical telemetry, may also be deployed in the borehole 106 to transmit data from the thin film multivariate optical element and detector combination 120 and other downhole components to the controller 184.

Additional descriptions of the operations performed by the thin film multivariate optical element and detector combination 120 are provided in the paragraphs below. Further, additional illustrations of the thin film multivariate optical element and detector combination 120 and similar thin film multivariate optical element and detector combinations are provided in at least FIGS. 2A-2F. Further, additional illustrations of thin film optical detectors are illustrated in FIGS. 3A, and 3B. Although FIGS. 1A and 1B each illustrates a single thin film multivariate optical element and detector combination 120 deployed in the borehole 106, multiple thin film multivariate optical element and detector combinations and thin film optical detectors may be simultaneously deployed in the borehole 106 to perform operations described herein.

Figure 2A:
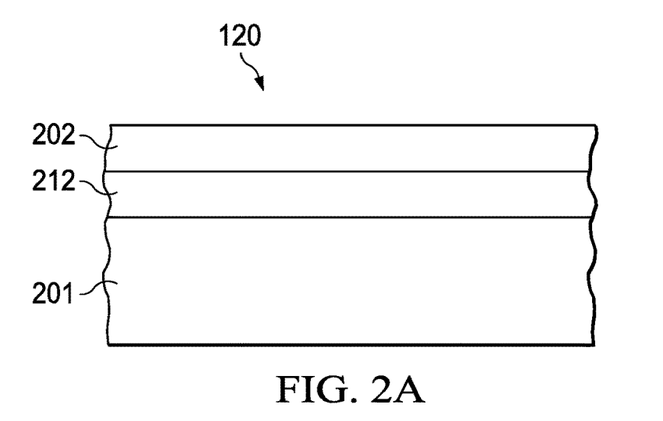
FIG. 2A is a perspective view of the thin film multivariate optical element and detector combination of FIG. 1A.
Figure 3A:
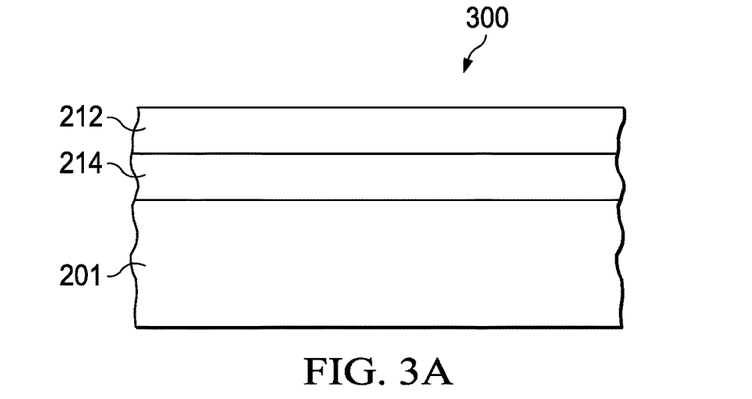
FIG. 3A is a front view of a thin film optical detector that does not utilize any multivariate optical element.
Figure 3B:
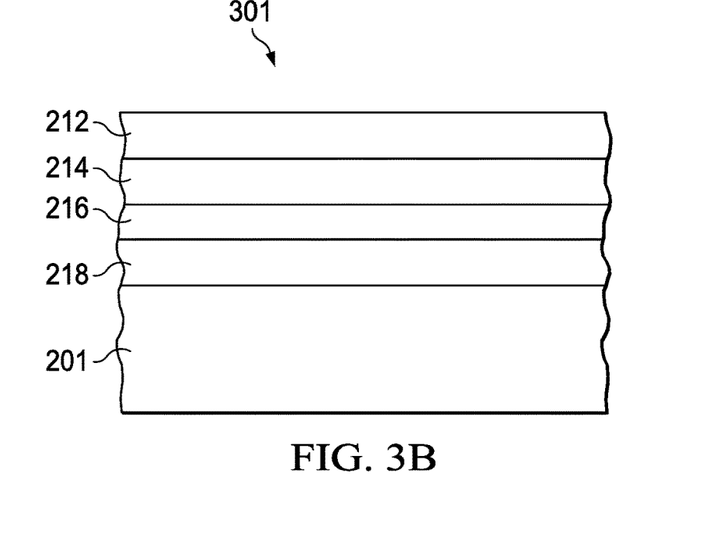
FIG. 3B is a front view of another thin film optical detector, similar to the thin film optical detector of FIG. 3A.

FIG. 2A is a perspective view of the thin film multivariate optical element and detector combination 120 of FIG. 1A. In the illustrated embodiment, the thin film multivariate optical element and detector combination 120 includes a first layer of multivariate optical element 202, a first layer of detector film 212, and a substrate 201. In the illustrated embodiment, the first layer of multivariate optical element 202 is stacked on top of the first layer of detector film 212, which in turn is stacked on top of the substrate 201. The first layer of multivariate optical element 202 manipulates the optical signals. The first layer of detector film 212 then converts the manipulated optical signals into electrical signals. In some embodiments, the substrate 201 also functions as a multivariate optical element to manipulate properties of optical signals and to manipulate the optical signals. In one or more of such embodiments, the substrate 201 is formed from materials having material properties that generate a spectral pattern that manipulates optical signals. In some embodiments, the substrate also functions as a detector to convert the manipulated optical signals into electrical signals. In one or more of such embodiments, the substrate 201 is formed from materials having material properties that convert the manipulated optical signals into electrical signals.

Figure 2B:
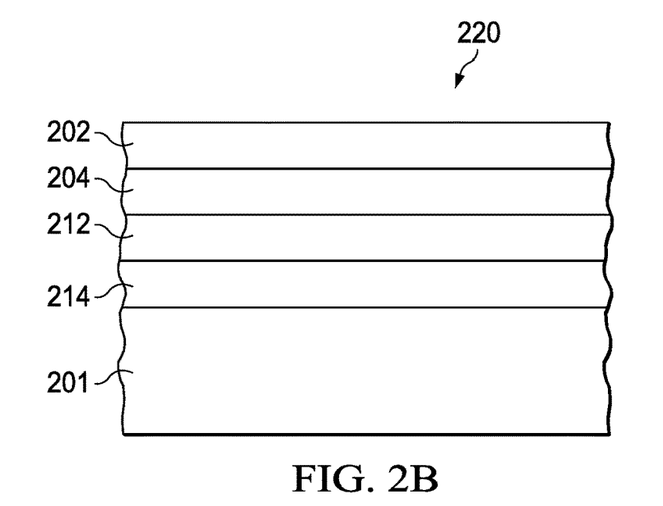
FIG. 2B is a front view of another thin film multivariate optical element and detector combination, similar to the thin film multivariate optical element and detector combination of FIG. 1A.

FIG. 2B is a front view of another thin film multivariate optical element and detector combination 220, similar to the thin film multivariate optical element and detector combination 120 of FIG. 1A. In the illustrated embodiment, the thin film multivariate optical element and detector combination 220 includes the first layer of multivariate optical element 202, a second layer of multivariate optical element 204, the first layer of detector film 212, a second layer of detector film 214, and the substrate 201. In the illustrated embodiment, the first layer of multivariate optical element 202 is stacked on top of the second layer of multivariate optical element 204, which is stacked on top of the first layer of detector film 212, which is stacked on top of the second layer of detector film 214, which in turn is stacked on top of the substrate 201. The first and second layers of multivariate optical element 202 and 204 progressively or collectively manipulate incoming optical signals. The first layer of detector film 212 and the second layer of detector film 204 then progressively convert the manipulated optical signals into electrical signals. In some embodiments, the thin film multivariate optical element and detector combination 220 includes a different number of layers of multivariate optical elements and a different number of layers of detector films. In one of such embodiments, the thin film multivariate optical element and detector combination 220 includes four layers of multivariate optical elements and four layers of detector films.

Figure 2C:
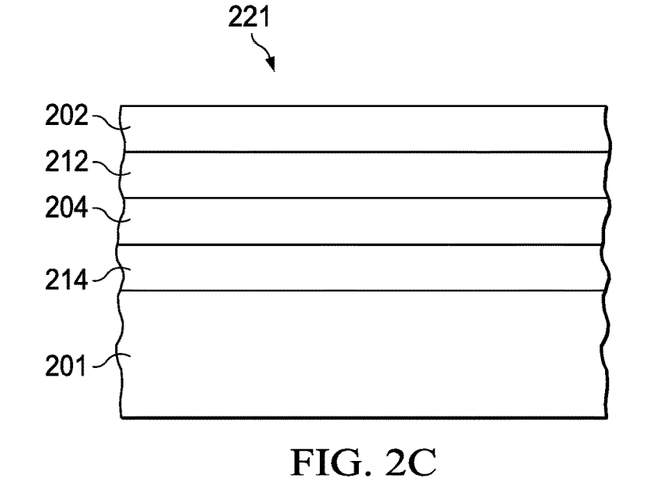
FIG. 2C is a front view of another thin film multivariate optical element and detector combination, similar to the thin film multivariate optical element and detector combination of FIG. 2B.

FIG. 2C is a front view of another thin film multivariate optical element and detector combination 221, similar to the thin film multivariate optical element and detector combination 220 of FIG. 2B. The thin film multivariate optical element and detector combination 221 also includes the first layer of multivariate optical element 202, the second layer of multivariate optical element 204, the first layer of detector film 212, the second layer of detector film 214, and the substrate 201. However, in the illustrated embodiment, the first layer of multivariate optical element 202 is stacked on top of the first layer of detector film 212, which is stacked on top of the second layer of multivariate optical element 204, which is which is stacked on top of the second layer of detector film 214, which in turn is stacked on top of the substrate 201. In the illustrated embodiment, the first layer of multivariate optical element 202 manipulates the optical signals by manipulating properties of the optical signals. The first layer of detector film 212 then converts certain optical signals that have passed through the first layer of multivariate optical element 202 into electrical signals. The second layer of multivariate optical element 204 manipulates certain optical signals that have passed through the first layer of detector film 212. The second layer of detector film 214 then converts certain optical signals that have passed through the second layer of multivariate optical element 204 into electrical signals. In some embodiments, the thin film multivariate optical element and detector combination 221 includes a different number of layers of multivariate optical elements and a different number of layers of detector films. In one or more of such embodiments, two or more adjacent layers of multivariate optical elements are stacked on top of a layer of detector film, which is stacked on top of one or more layers of multivariate optical elements. In one or more of such embodiments, one or more layers of multivariate optical elements are stacked on top of a layer of detector film, which is stacked on top of two or more adjacent layers of multivariate optical elements. In one or more of such embodiments, two or more adjacent layers of detector films are stacked on top of a layer of multivariate optical elements, which is stacked on top of one or more layers of detector films. In one or more of such embodiments, one or more layers of detector films are stacked on top of a layer of multivariate optical elements, which is stacked on top of two or more adjacent layers of detector films.

Figure 2D:
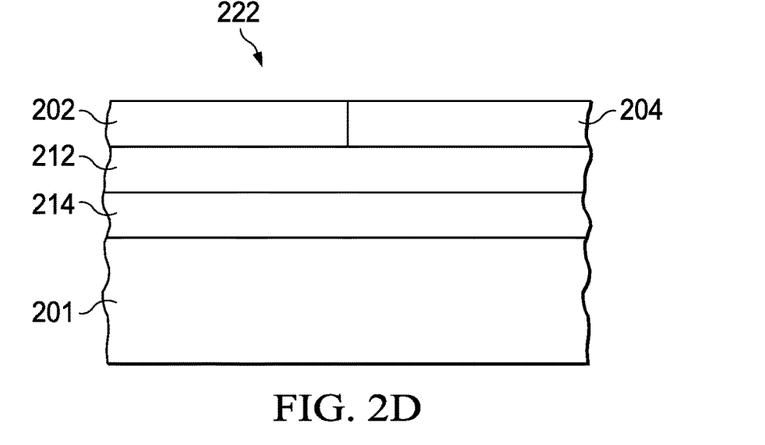
FIG. 2D is a front view of another thin film multivariate optical element and detector combination, similar to the thin film multivariate optical element and detector combination of FIG. 2B.

FIG. 2D is a front view of another thin film multivariate optical element and detector combination 222, similar to the thin film multivariate optical element and detector combination 220 of FIG. 2B. The thin film multivariate optical element and detector combination 222 also includes the first layer of multivariate optical element 202, the second layer of multivariate optical element 204, the first layer of detector film 212, the second layer of detector film 214, and the substrate 201. However, the first layer of multivariate optical element 202 is only stacked on top of a first portion of the first layer of detector film 212, whereas the second layer of multivariate optical element 204 is stacked on top of a different portion of the first layer of detector film 212. In the illustrated embodiment, the first layer of multivariate optical element 202 and the second layer of multivariate optical element 204 collectively or separately manipulate the optical signals. The first layer of detector film 212 then converts certain optical signals that have passed through the first and second layers of multivariate optical element 202 and 204 into electrical signals. The second layer of detector film 214 then converts certain optical signals that have passed through the first layer of detector film 212 into electrical signals.

FIG. 2D' is a front view of another thin film multivariate optical element and detector combination 222', similar to the thin film multivariate optical element and detector combination 220 of FIG. 2B. The thin film multivariate optical element and detector combination 222' also includes the first layer of multivariate optical element 202, the second layer of multivariate optical element 204, the first layer of detector film 212, the second layer of detector film 214, and the substrate 201. Moreover, the first layer of multivariate optical element 202 is stacked on top of the second layer of multivariate optical element 204, which is stacked on top of the first layer of thin film detector 212 and the second layer of thin film detector 214. However, the first layer of thin film detector 212 is only stacked on top of a first portion of the substrate 201, whereas the second layer of thin film detector 214 is stacked on top of a different portion of the substrate 201. In the illustrated embodiment, the first layer of multivariate optical element 202 and the second layer of multivariate optical element 204 collectively or separately manipulate the optical signals. The first layer of detector film 212 then converts certain optical signals that have passed through the first and second layers of multivariate optical element 202 and 204 into electrical signals while the second layer of detector film 214 converts other optical signals that have passed through the first layer of detector film 212 into electrical signals.

Figure 2E:
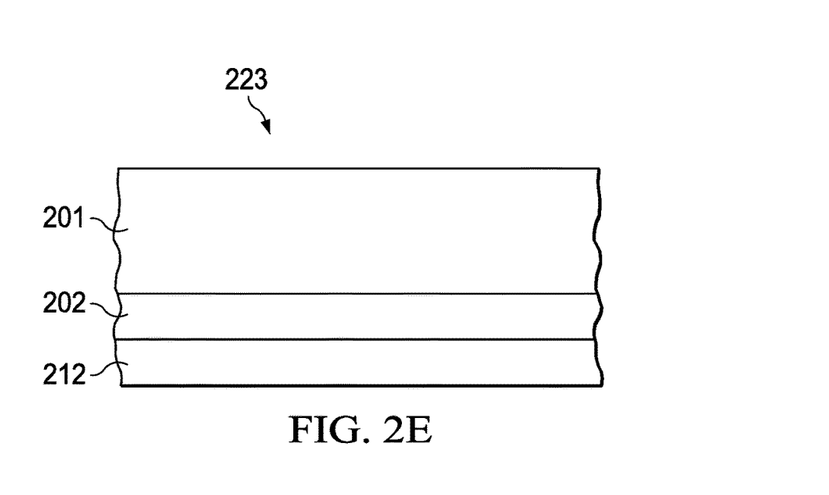
FIG. 2E is a front view of another thin film multivariate optical element and detector combination, similar to the thin film multivariate optical element and detector combination of FIG. 2A.

FIG. 2E is a front view of another thin film multivariate optical element and detector combination 223, similar to the thin film multivariate optical element and detector combination 120 of FIG. 2A. In the illustrated embodiment, the substrate 201 is stacked on top of the first layer of multivariate optical element 202, which is stacked on top of the first layer of detector film 212. In some embodiments, the substrate is stacked on top of a different number of layers of multivariate optical elements and a different number of layers of detector films. In some embodiments, the substrate 201 also functions as a multivariate optical element to manipulate properties of optical signals and to manipulate the optical signals. In other embodiments, the substrate 201 also functions as a detector to convert the manipulated optical signals into electrical signals. In further elements, the substrate 201 also functions as both a multivariate optical element and as a detector to manipulate optical signals and to convert the manipulated optical signals into electrical signals.

Figure 2F:
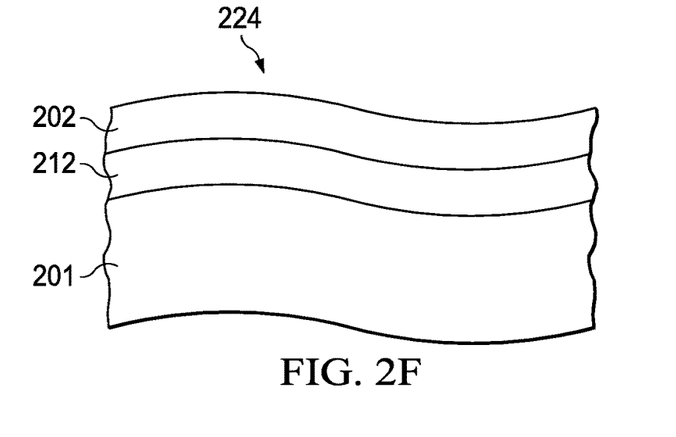
FIG. 2F is a front view of another thin film multivariate optical element and detector combination, similar to the thin film multivariate optical element and detector combination of FIG. 2A.

FIG. 2F is a front view of another thin film multivariate optical element and detector combination 224, similar to the thin film multivariate optical element and detector combination 120 of FIG. 2A. In the illustrated embodiment, the substrate 201 is formed from a flexible material that allows the substrate 201 to conform to different shapes. In the illustrated embodiment, the first layer of multivariate optical element 202 and the first layer of detector film 212 are also formed from flexible materials and are stacked on top of the substrate 201. Similar to the embodiment illustrated in FIG. 2A, the first layer of multivariate optical element 202 of FIG. 2F manipulates the optical signals and the first layer of detector film 212 of FIG. 2F converts the manipulated optical signals into electrical signals.

FIG. 3A is a front view of a thin film optical detector 300 that does not utilize any multivariate optical element. More particularly, in some embodiments, certain layers of detector films are modified and optimized such that they can do two things simultaneously: (1) manipulate the optical signals just like a multivariate optical element; and (2) convert the manipulated optical signals into electrical signals just like an optical detector. Similarly, in some embodiments, certain layers of multivariate optical element films are modified and optimized such that they can do two things simultaneously: (1) manipulate the optical signals just like a multivariate optical element; and (2) convert the manipulated optical signals into electrical signals just like an optical detector. The modifications/optimizations described above may refer to film thickness, doping, texturizing, implanting, and other properties/processes. In the illustrated embodiment, the thin film optical detector 300 is formed from the first layer of detector film 212, the second layer of detector film 214, and the substrate 201. Further, the first layer of detector film 212 is stacked on top of the second layer of detector film 214, which is stacked on top of the substrate 201. In the illustrated embodiment, the material properties of the first layer of detector film 212 allows the first layer of detector film 212 to manipulate the optical signals. In some embodiments, the first layer of detector film 212 also converts certain optical signals directed at the first layer of detector film 212 into electrical signals. The second layer of detector film 214 then converts the optical signals that have passed through the first layer of detector film 212 into electrical signals. In other embodiments, both the first layer of detector film 212 and the second layer of detector film 214 are formed from materials that allow the respective layer of detector film to simultaneously manipulate optical signals and to convert the manipulated optical signals into electrical signals.

In some embodiments, the substrate 201 can also function as a multivariate optical element to manipulate properties of the optical signal. In one or more of such embodiments, the thin film optical detector is formed from the first layer of detector film 212 and the substrate 201.

FIG. 3B is a front view of another thin film optical detector 301, similar to the thin film optical detector 300 of FIG. 3A. In the illustrated embodiment, the thin film optical detector 301 includes the first layer of detector film 212, the second layer of detector film 214, a third layer of detector film 216, a fourth layer of detector film 218, and the substrate 201. In the illustrated embodiment, the first layer of detector film 212 is stacked on top of the second layer of detector film 214, which is stacked on top of the third layer of detector film 216, which is stacked on top of the fourth layer of detector film 218, which in turn is stacked on top of the substrate 201. The first and second layers of detector films 212 and 214 are formed from materials that progressively or collectively manipulate incoming optical signals. Further, the third layer of detector film 216 and the fourth layer of detector film 218 then progressively convert the optical signals that have passed through the first and second layers of detector films 212 and 214 into electrical signals. In some embodiments, the thin film optical detectors 300 and 301 of FIGS. 3A and 3B include a different number of layers of detector films. In one or more of such embodiments, more than two layers of detector films are formed from materials that progressively or collectively manipulate incoming optical signals.

FIGS. 2A-2F illustrate several embodiments of a thin film multivariate optical element and detector combination, and FIGS. 3A-3B illustrate several embodiments of a thin film optical detector. In further embodiments, a multivariate optical element and detector combination is formed without any layers of thin film multivariate optical element as illustrated in FIGS. 2A-2F or any layer of detector film as illustrated in FIGS. 2A-2F and 3A-3B. In such embodiments, a substrate, such as the substrate 201 is used as is, modified, or optimized such that the substrate can do two things simultaneously: (1) manipulate the optical signals just like a multivariate optical element; and (2) convert the manipulated optical signals into electrical signals just like an optical detector.

Figure 4:
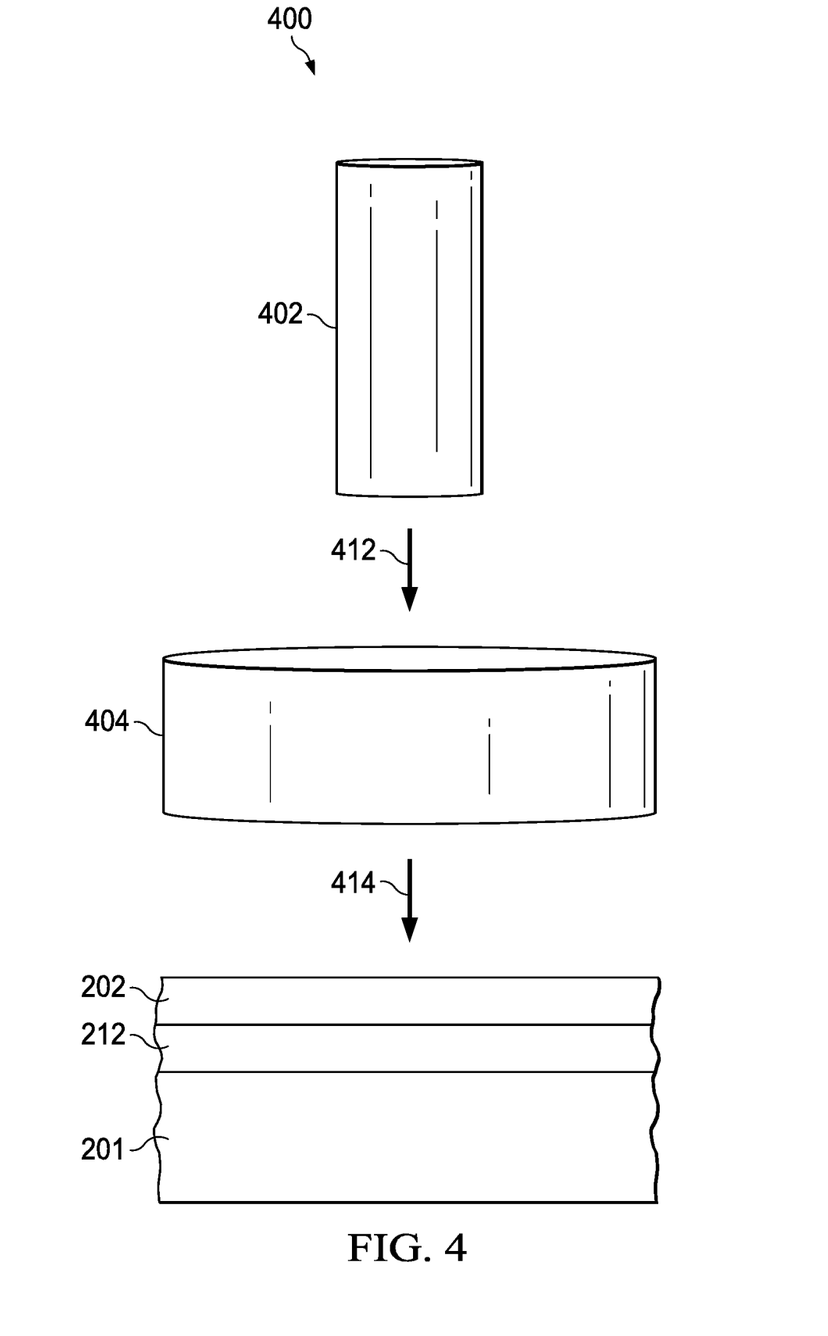
FIG. 4 is a front view of a downhole optical computing system that utilizes the thin film multivariate optical element and detector combination of FIG. 2A to convert optical signals into electrical signals.

FIG. 4 is a front view of a downhole optical computing system 400 that utilizes the thin film multivariate optical element and detector combination 120 of FIG. 2A to convert optical signals into electrical signals. The downhole optical computing system 400 includes an optical source 402. In some embodiments, the optical source 402 is the conveyance 116 of FIG. 1A, through which, optical signals are transmitted downhole. In other embodiments, the optical source 402 is a device (such as a laser) that is operable to generate optical signals. Optical signals transmitted or generated by the optical source 402 pass through a sample 404. In some embodiments, the sample 404 is a downhole sample. In other embodiments, the sample 404 is a surface based sample. The sample 404 may be any mineral, solid, gas, or fluid deposited in the formation 112 of FIG. 1A. In some embodiments, the sample 404 is stored in a chamber of a downhole tool (not shown) that is deployed in the borehole 106. In other embodiments, the sample 404 remains deposited in the formation. In further embodiments, the sample 404 is flowing through the borehole 106 or through the conveyance 116. As optical signals pass through the sample 404, optical properties of the optical signals (such as the power spectrum, attenuation, phase, refraction, reflection, dispersion, as well as other properties) are altered by the sample 404, where the change in the optical properties of the optical signals may be analyzed to estimate the material properties of the sample 404.

The optical signals then pass through the thin film multivariate optical element and detector combination 120, where the optical signals are converted into electrical signals that are indicative of the material properties of the sample 404. In the illustrated embodiment, the downhole optical computing system 400 utilizes the thin film multivariate optical element and detector combination 120 illustrated in FIG. 2A, which includes the first layer of multivariate optical element 202 and the first layer of detector film 212, both stacked on top of the substrate 201, to manipulate the optical signals. In other embodiments, the downhole optical computing system 400 may utilize any of the thin film multivariate optical element and detector combinations or thin film optical detectors illustrated in FIGS. 2A-2F, 3A, 3B, or similar detector combinations or detectors to manipulate the optical signals. In some embodiments, the electrical signals are then transmitted via a telemetry system, such as a telemetry system described herein, to the controller 184 of FIG. 1A. In one or more of such embodiments, the telemetry system and the controller 184 are also components of the downhole optical computing system 400.

The above-disclosed embodiments have been presented for purposes of illustration and to enable one of ordinary skill in the art to practice the disclosure, but the disclosure is not intended to be exhaustive or limited to the forms disclosed. Many insubstantial modifications and variations will be apparent to those of ordinary skill in the art without departing from the scope and spirit of the disclosure. For instance, although the flowcharts depict a serial process, some of the steps/processes may be performed in parallel or out of sequence, or combined into a single step/process. The scope of the claims is intended to broadly cover the disclosed embodiments and any such modification. Further, the following clauses represent additional embodiments of the disclosure and should be considered within the scope of the disclosure:

Clause 1, a thin film multivariate optical element and detector combination, comprising: at least one layer of multivariate optical element having patterns that manipulate at least one spectrum of optical signals; at least one layer of detector film that converts manipulated optical signals into electrical signals; and a substrate, wherein the at least one layer of multivariate optical element and the at least one layer of detector film are deposited on the substrate.

Clause 2, the thin film multivariate optical element and detector combination of clause 1, further comprising a bottom layer of detector film that is deposited on the substrate; a top layer of detector film that is deposited on the bottom layer of detector film; a bottom layer of multivariate optical element that is deposited on the top layer of detector film; and a top layer of multivariate optical element that is deposited on the bottom layer of multivariate element.

Clause 3, the thin film multivariate optical element and detector combination of clause 1 or 2, further comprising at least two layers of multivariate optical element that are deposited between the top layer of the multivariate optical element and the bottom layer of the multivariate optical element; and at least two layers of detector films that are deposited between the top layer of detector film and the bottom layer of detector film.

Clause 4, the thin film multivariate optical element and detector combination of any of clauses 1, further comprising a bottom layer of multivariate optical element that is deposited on the substrate; a bottom layer of detector film that is deposited on the bottom layer of multivariate optical element; a top layer of detector film that is deposited on the bottom layer of detector film; and a top layer of multivariate optical element that is deposited on the top layer of top layer of detector film.

Clause 5, the thin film multivariate optical element and detector combination of any of clauses 1-4, further comprising a first surface area of the at least one layer of detector films; a second surface area of the at least one layer of detector films; a first layer of the at least one multivariate optical element that is stacked over the first surface area; and a second layer of the at least one multivariate optical element that is stacked over the second surface area.

Clause 6, the thin film multivariate optical element and detector combination of any of clauses 1-5, wherein each layer of the at least one layer of multivariate optical element is less than 100 µm thick, and wherein each layer of the at least one layer of detector film is less than 100 µm thick.

Clause 7, the thin film multivariate optical element and detector combination of any of clauses 1-6, wherein the substrate is formed from a flexible material.

Clause 8, the thin film multivariate optical element and detector combination of any of clauses 1-7, wherein the substrate has an adhesive surface that is affixed to a downhole tool deployed in a downhole location.

Clause 9, the thin film multivariate optical element and detector combination of any of clauses 1-8, wherein the optical signals pass through the substrate before reaching the at least one layer of multivariate optical element.

Clause 10, the thin film multivariate optical element and detector combination of any of clauses 1-9, wherein the substrate is formed from a material having material properties that generate a spectral pattern that manipulates the at least one spectrum of the optical signals.

Clause 11, the thin film multivariate optical element and detector combination of any of clauses 1-10, wherein the substrate is formed from a material having material properties that convert the manipulated optical signals into electrical signals.

Clause 12, the thin film multivariate optical element and detector combination of any of clauses 1-11, further comprising a reflective layer positioned between the at least one layer of detector film and the substrate, where a portion of the optical signals passed through the at least one layer of detector film is reflected back to the at least one layer of detector film.

Clause 13, a thin film optical detector, comprising: a first detector film having material properties that generate a spectral pattern that manipulate at least one spectrum of optical signals; and a substrate, wherein the first detector film is deposited over the substrate.

Clause 14, the thin film optical detector of clause 13, further comprising a second detector film deposited between the first detector film and the substrate, wherein the second detector film comprises material properties that convert the manipulated optical signals into electrical signals.

Clause 15, the thin film optical detector of clause 13 or 14, further comprising: a third detector film having material properties that generate a spectral pattern that further manipulates the optical signals; and a fourth detector film having material properties that convert manipulated optical signals into electrical signals, wherein the third detector film is deposited in between the second detector film and the fourth detector film, and wherein the fourth detector film is deposited in between the third detector film and the substrate.

Clause 16, the thin film optical detector of any of clauses 13-15, wherein the substrate is formed from a flexible material.

Clause 17, thin film optical detector of any of clauses 13-16, wherein the substrate is formed from a material having properties that convert the manipulated optical signals into electrical signals.

Clause 18, a downhole optical computing system, comprising: an optical source that transmits optical signals downhole; at least one layer of multivariate optical element that receives optical signals, wherein the at least one layer of multivariate optical element generates a spectral pattern that manipulates at least one spectrum of optical signals; at least one layer of detector film that converts manipulated optical signals into electrical signals; and a substrate that is deployed in a downhole location, wherein the at least one layer of multivariate optical element and the at least one layer of detector film are deposited on the substrate.

Clause 19, the downhole optical computer system of clause 18, further comprising a bottom layer of detector film that is deposited on the substrate; a top layer of detector film that is deposited on the bottom layer of detector film; a bottom layer of multivariate optical element that is deposited on the top layer of detector film; and a top layer of multivariate optical element that is deposited on the bottom layer of multivariate element.

Clause 20, the downhole optical computer system of clause 18, further comprising a bottom layer of multivariate optical element that is deposited on the substrate; a bottom layer of detector film that is deposited on the bottom layer of multivariate optical element; a top layer of detector film that is deposited on the bottom layer of detector film; and a top layer of multivariate optical element that is deposited on the top layer of top layer of detector film.

Clause 21, a multivariate optical element and detector combination, comprising at least one substrate having material properties to generate a spectral pattern that manipulates at least one spectrum of optical signals, and to convert the manipulated optical signals into electrical signals.

Although certain embodiments disclosed herein describes transmitting electrical currents from electrodes deployed on an inner string to electrodes deployed on an outer string, one of ordinary skill would understand that the subject technology disclosed herein may also be implemented to transmit electrical currents from electrodes deployed on the outer string to electrodes deployed on the inner string.

As used herein, the singular forms "a", "an" and "the" are intended to include the plural forms as well, unless the context clearly indicates otherwise. It will be further understood that the terms "comprise" and/or "comprising," when used in this specification and/or the claims, specify the presence of stated features, steps, operations, elements, and/or components, but do not preclude the presence or addition of one or more other features, steps, operations, elements, components, and/or groups thereof. In addition, the steps and components described in the above embodiments and figures are merely illustrative and do not imply that any particular step or component is a requirement of a claimed embodiment.

What is claimed is:

1. A thin film multivariate optical element, detector, and conveyance combination, comprising:
   a conveyance deployed in a borehole of a hydrocarbon well, the conveyance being a wireline, slickline, coiled tubing, drill pipe, production tubing, fiber optic cable, or downhole tracker;
   at least one layer of multivariate optical element formed from a flexible material and having patterns that manipulate at least one spectrum of optical signals while the thin film multivariate optical element and detector combination is deployed in a downhole environment, wherein manipulation of the at least one spectrum of optical signals by the patterns improves at least one correlation between the at least one spectrum of optical signals and at least one property of a downhole sample;
   at least one layer of detector film that converts the manipulated optical signals into electrical signals; and
   a substrate, wherein the at least one layer of multivariate optical element and the at least one layer of detector film are deposited on the substrate,
   wherein the at least one layer of multivariate optical element, the at least one layer of detector film, and the substrate are deployed downhole along a section of the conveyance.

2. The thin film multivariate optical element and detector combination of claim 1, further comprising:
   a bottom layer of detector film that is deposited on the substrate;
   a top layer of detector film that is deposited on the bottom layer of detector film;
   a bottom layer of multivariate optical element that is deposited on the top layer of detector film; and
   a top layer of multivariate optical element that is deposited on the bottom layer of multivariate element.

3. The thin film multivariate optical element and detector combination of claim 2, further comprising:
   at least two layers of multivariate optical elements that are deposited between the top layer of multivariate optical element and the bottom layer of multivariate optical element; and
   at least two layers of detector films that are deposited between the top layer of detector film and the bottom layer of detector film.

4. The thin film multivariate optical element and detector combination of claim 1, further comprising:
   a bottom layer of multivariate optical element that is deposited on the substrate;
   a bottom layer of detector film that is deposited on the bottom layer of multivariate optical element;
   a top layer of detector film that is deposited on the bottom layer of detector film; and
   a top layer of multivariate optical element that is deposited on the top layer of top layer of detector film.

5. The thin film multivariate optical element and detector combination of claim 1, further comprising:
   a first surface area of the at least one layer of detector films;
   a second surface area of the at least one layer of detector films;
   a first layer of the at least one multivariate optical element that is stacked over the first surface area; and
   a second layer of the at least one multivariate optical element that is stacked over the second surface area.

6. The thin film multivariate optical element and detector combination of claim 1, wherein each layer of the at least one layer of multivariate optical element is less than 100 μm thick, and wherein each layer of the at least one layer of detector film is less than 100 μm thick.

7. The thin film multivariate optical element and detector combination of claim 1, wherein the substrate is formed from a flexible material.

8. The thin film multivariate optical element and detector combination of claim 7, wherein the substrate has an adhesive surface that is affixed to a downhole tool deployed in a downhole location.

9. The thin film multivariate optical element and detector combination of claim 1, wherein the optical signals pass through the substrate before reaching the at least one layer of multivariate optical element.

10. The thin film multivariate optical element and detector combination of claim 9, wherein the substrate is formed from a material having material properties that generate a spectral pattern that manipulates the at least one spectrum of the optical signals.

11. The thin film multivariate optical element and detector combination of claim 1, wherein the substrate is formed from a material having material properties that convert the manipulated optical signals into electrical signals.

12. The thin film multivariate optical element and detector combination of claim 1, further comprising a reflective layer positioned between the at least one layer of detector film and the substrate, where a portion of the optical signals passed through the at least one layer of detector film is reflected back to the at least one layer of detector film.

13. A thin film optical detector and conveyance combination, comprising:
   a conveyance deployed in a wellbore, the conveyance being a wireline, slickline, coiled tubing, drill pipe, production tubing, fiber optic cable, or downhole tracker;
   a first detector film formed from a flexible material and having material properties that generate a spectral pattern that manipulates at least one spectrum of optical signals while the thin film optical detector is deployed in a downhole environment, wherein manipulation of the at least one spectrum of optical signals by the spectral pattern improves at least one correlation between the at least one spectrum of optical signals and at least one property of a downhole sample; and
   a substrate, wherein the first detector film is deposited over the substrate,
   wherein the first detector film and the substrate are deployed downhole along a section of the conveyance.

14. The thin film optical detector of claim 13, further comprising a second detector film deposited between the first detector film and the substrate, wherein the second detector film comprises material properties that convert the manipulated optical signals into electrical signals.

15. The thin film optical detector of claim 14, further comprising:
   a third detector film having material properties that generate a spectral pattern that further manipulates the at least one spectrum of the optical signals; and
   a fourth detector film having material properties that convert the manipulated optical signals into electrical signals,
   wherein the third detector film is deposited in between the second detector film and the fourth detector film, and
   wherein the fourth detector film is deposited in between the third detector film and the substrate.

16. The thin film optical detector of claim 13, wherein the substrate is formed from a flexible material.

17. The thin film optical detector of claim 13, wherein the substrate is formed from a material having properties that convert the manipulated optical signals into electrical signals.

18. A downhole optical computing system, comprising:
   a conveyance deployed in a wellbore, the conveyance being a wireline, slickline, coiled tubing, drill pipe, production tubing, fiber optic cable, or downhole tracker;
   an optical source that transmits optical signals downhole;
   at least one layer of multivariate optical element that receives optical signals, wherein the at least one layer of multivariate optical element is formed from a flexible material, wherein the at least one layer of multivariate optical element generates a spectral pattern that manipulates at least one spectrum of optical signals while the downhole optical computing system is deployed in a downhole environment, and wherein manipulation of the at least one spectrum of optical signals by the spectral pattern improves at least one correlation between the at least one spectrum of optical signals and at least one property of a downhole sample;
   at least one layer of detector film that converts the optical signals into electrical signals; and
   a substrate that is deployed in a downhole location, wherein the at least one layer of multivariate optical element and the at least one layer of detector film are deposited on the substrate,
   wherein the at least one layer of multivariate optical element, the at least one layer of detector film, and the substrate are deployed downhole along a section of the conveyance.

19. The downhole optical computer system of claim 18, further comprising:
   a bottom layer of detector film that is deposited on the substrate;
   a top layer of detector film that is deposited on the bottom layer of detector film;
   a bottom layer of multivariate optical element that is deposited on the top layer of detector film; and
   a top layer of multivariate optical element that is deposited on the bottom layer of multivariate element.

20. The downhole optical computer system of claim 18, further comprising:
   a bottom layer of multivariate optical element that is deposited on the substrate;
   a bottom layer of detector film that is deposited on the bottom layer of multivariate optical element;
   a top layer of detector film that is deposited on the bottom layer of detector film; and
   a top layer of multivariate optical element that is deposited on the top layer of top layer of detector film.

* * * * *